No. 678,844. Patented July 16, 1901.
S. A. SNOW & A. TAYLOR.
FRUIT OR VEGETABLE MASHER.
(Application filed Mar. 22, 1900.)
(No Model.)
Fig. 1.
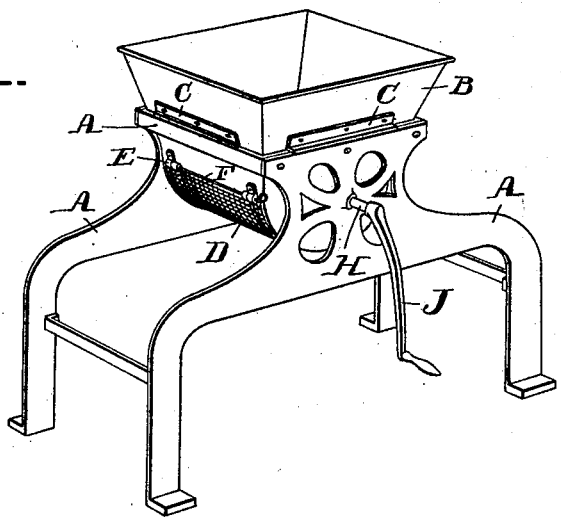
Fig. 2.
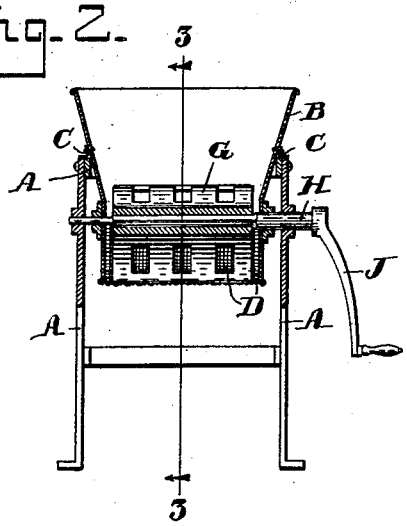
Fig. 3.
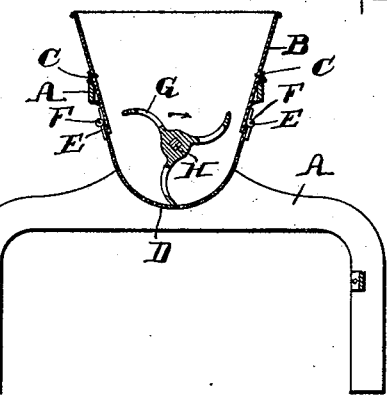
Fig. 4.
Fig. 5.
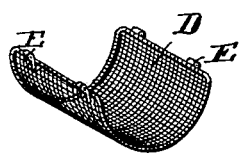
Fig. 6.
Witnesses:
Charles F. Logan.
J. J. Daly.
Inventors:
S. Augustus Snow
Arthur Taylor
by M. N. Bennett, Atty

UNITED STATES PATENT OFFICE.

SPARROW AUGUSTUS SNOW, OF ARLINGTON, AND ARTHUR TAYLOR, OF BOSTON, MASSACHUSETTS; SAID SNOW ASSIGNOR TO SAID TAYLOR.

FRUIT OR VEGETABLE MASHER.

SPECIFICATION forming part of Letters Patent No. 678,844, dated July 16, 1901.

Application filed March 22, 1900. Serial No. 9,707. (No model.)

*To all whom it may concern:*

Be it known that we, SPARROW AUGUSTUS SNOW, of Arlington, in the county of Middlesex, and ARTHUR TAYLOR, of Boston, in the county of Suffolk, State of Massachusetts, have jointly invented certain new and useful Improvements in Fruit or Vegetable Mashers, of which the following is a specification.

The object of this invention is to provide a vegetable-masher especially adapted for restaurants, hotels, and public institutions, where large quantities of material are to be treated speedily.

Our machine is unusually simple and effective and is peculiar in the ready detachability of the parts for cleansing after use. It is therefore adapted for treating the various sorts of vegetables, fruits, &c., successively.

Our improved machine consists of an independent supporting-frame, a removable hopper mounted therein and preferably made tapering, a curved detachable strainer closing the lower part of the hopper, and rotatable mashing-blades running in close proximity to said strainer and actuated by a removable driving-shaft having its bearings in the frame or hopper, or both. Abundant space is left beneath the frame and strainer for a receiving pan or vessel. The three blades of the masher curve rearwardly and are formed integral with a central hub having an axial perforation to fit and engage the shaft whether round or square, and each blade has preferably two or more openings through it, allowing the potato or other material to crowd through and be partially crushed. The strainer is of stout wire-netting having a heavier marginal wire inclosed in its border, which in use lies just inside of the curved lower edges of the hopper sides, while the ends of the strainer and hopper are furnished with fastenings for quickly connecting and disconnecting them. Two sets of eyes and connecting-rods through them are suitable for this purpose. The strainer may, however, be supported by an internal flange, bead, or rib wholly within the hopper-mouth. External strips of angle-iron or the like on the sides of the hopper at the line of contact with the top of the frame form a stop or rest to hold the hopper and its strainer in proper relation to the frame, the mashing-blades, and the driving-shaft. It will thus be seen as characteristic of our machine that all the parts are separable on removing the driving-shaft, since the masher is then removable from the hopper, the hopper from the frame, and the frame is entirely independent of any receptacle to receive the mashed material.

The strainer is detachable from the hopper at any time without otherwise dismembering the machine. This permits frequent cleansing and ready replacing of the part most difficult to keep sweet and exposes the beater-blades and the smooth interior of the hopper to be wiped out when desired. The strainer having no wooden or other inclosing frame or grooved way for such frame to slide in no lodgment is given for decayed particles of vegetable matter or other impurities. The hopper with its detachable strainer-bottom is the only receptacle connected with our machine.

In the drawings, Figure 1 is a perspective view of our machine in position for use. Fig. 2 is a vertical section in the plane of the driving-shaft, and Fig. 3 a like section on line 3 3 of Fig. 2. Figs. 4, 5, and 6 show the mashing-blades, the strainer, and the connecting-pin detached.

A represents a suitable form of frame consisting of two side pieces connected at top and bottom by cross-bars, leaving at top a rectangular opening to receive the hopper. The hopper B is of rectangular cross-section and tapers downwardly, the lower portion of its walls being shown vertical in Fig. 2. A suitable stop supports the hopper within the frame in proper position. In Figs. 1, 2, and 3 such a stop consists of strips of angle-iron C, secured on the outer wall of the hopper at the line of the top of the frame.

D represents the strainer, which closes the lower end of the hopper and is removably secured thereto in any suitable manner. Such strainer is formed of wire-netting having a marginal wire within its border and is made first as a flat mat and afterward bent to a semicircular or arc shape to fit the lower portion of the hopper, for which it forms a reticulated bottom. The marginal wire holds the network in proper curvature and affords a suitable foundation for fastening-hooks or other devices, by which the strainer may be secured to the hopper. The drawings illustrate such fastening means in the form of eyes E on the hopper and the ends of the strainer and the connecting wire F readily inserted in and removed from such eyes to attach and detach the strainer. We sometimes make the strainer broad enough so that the marginal wire shall lie just outside of the lower edges of the hopper sides. Perforated sheet metal could be substituted for the netted strainer; but we deem the network much better for most purposes.

G represents the mashing wings or blades, preferably three in number and all formed integral with the central hub, which has an axial perforation to receive the driving-shaft. These wings curve rearwardly, so as to press the material through the strainer, and are formed with openings through them to permit some of the material to pass through, which eases the movement of the machine and increases its efficiency. The wings G are of such length as to nearly or quite fill the space between the lower walls of the hopper and of such width as to move in close proximity to the strainer.

H is the driving-shaft, mounted in bearings in the frame and extending through the sides of the hopper. The body of this shaft is represented as square to fit a square axial opening through the hub of the wings G. The end of the shaft is provided with a suitable crank J. It will be seen that on withdrawal of the shaft from its working position the wings G, forming the masher proper, may be removed from the hopper and the hopper from the frame, and that such shaft may be readily replaced, holding the parts again in working position. The strainer may at any time be removed without detaching the other parts.

We thus provide a most efficient apparatus for the purpose designed and at the same time arrange for ready cleansing of any and all parts and for immediately assembling and uniting them again.

For small household machines the frame and hopper may be permanently united; but the strainer and masher proper should be detachable in any case.

We claim as our joint invention—

In a fruit and vegetable masher, a skeleton frame, a removable hopper fitting therein, made open at bottom and provided with external stops resting on the frame-top, and an arched strainer detachably secured to and closing the bottom opening in said hopper, in combination with a plurality of mashing-blades formed integral and having an angular axial perforation, and with a removable driving-shaft fitting said perforation and having its bearings formed through said frame and hopper, such shaft thus serving to connect the frame, hopper and mashing-blades for use and to disconnect them for cleansing, substantially as set forth.

In testimony whereof we have affixed our signatures in presence of two witnesses.

S. AUGUSTUS SNOW.
    ARTHUR TAYLOR.

Witnesses:
 A. H. SPENCER,
 J. G. DALY.